United States Patent
Lim et al.

(10) Patent No.: US 8,850,158 B2
(45) Date of Patent: Sep. 30, 2014

(54) APPARATUS FOR PROCESSING REMOTE PAGE FAULT AND METHOD THEREOF

(75) Inventors: Eun Ji Lim, Daejeon (KR); Gyu Il Cha, Daejeon (KR); Young Ho Kim, Daejeon (KR); Dong Jae Kang, Daejeon (KR); Sung In Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 243 days.

(21) Appl. No.: 13/327,635

(22) Filed: Dec. 15, 2011

(65) Prior Publication Data

US 2012/0159116 A1    Jun. 21, 2012

(30) Foreign Application Priority Data

Dec. 17, 2010  (KR) ................ 10-2010-0130086

(51) Int. Cl.
  *G06F 12/10* (2006.01)
  *G06F 12/08* (2006.01)
  *G06F 12/02* (2006.01)
(52) U.S. Cl.
  CPC ............ *G06F 12/08* (2013.01); *G06F 12/0284* (2013.01); *G06F 12/1009* (2013.01); *G06F 12/1072* (2013.01)
  USPC .......................................... 711/206; 711/203
(58) Field of Classification Search
  CPC ............ G06F 12/1072; G06F 12/1009; G06F 12/0284

USPC .................................................. 711/203, 206
See application file for complete search history.

(56) References Cited

U.S. PATENT DOCUMENTS 7,756,943 B1 * 7/2010 Wong .......................... 709/212
2009/0150511 A1   6/2009 Gross et al.

FOREIGN PATENT DOCUMENTS

KR    1020050117305 A   12/2005

OTHER PUBLICATIONS

Hyungsoo Jung et al., "Large-Memory Data Processing on a Remote Memory System using Commodity Hardware", The Korean Institute of Information Scientist and Engineers Academic Journal: System and Theory, Sep. 2007, p. 445-458, vol. 34.9.

* cited by examiner

*Primary Examiner* — Than Nguyen

(57) ABSTRACT

Disclosed is an apparatus for processing a remote page fault included in an optional local node within a cluster system configuring a large integration memory (CVM) by integrating individual memories of a plurality of nodes. The apparatus includes a memory including a CVM-map, a node memory information table, a virtual memory area, and a CVM page table, and a main controller mapping the large integration memory to an address space of a process when a user process requests memory allocation.

18 Claims, 6 Drawing Sheets

FIG. 3

CVM_map

| 1 |
|---|
| 1 |
| 0 |
| 0 |
| 0 |
| 1 |
| 1 |
| 0 |
| ⋮ |

112 mode_mem

| Node ID | Start page number | End page number | Start CVM page number | End CVM page number |
|---------|-------------------|-----------------|-----------------------|---------------------|
|         |                   |                 |                       |                     |
|         |                   |                 |                       |                     |

FIG. 5

VMA  113

| vm_start |
|----------|
| vm_end |
| fault handler pointer |

APPARATUS FOR PROCESSING REMOTE PAGE FAULT AND METHOD THEREOF

CROSS-REFERENCE TO RELATED APPLICATIONS

This application claims priority to and the benefit of Korean Patent Application No. 10-2010-0130086 filed in the Korean Intellectual Property Office on Dec. 17, 2010, the entire contents of which are incorporated herein by reference.

TECHNICAL FIELD

The present invention relates to an apparatus for processing a remote page fault and a method thereof, capable of processing a page fault occurring within an operating system (OS) at the time of accessing a large integration memory (or a remote memory) in an environment where a cluster system having a plurality of nodes connected to each other via a high-performance network supports the large integration memory formed by integrating respective physical memories of the nodes.

BACKGROUND

A cluster system includes a plurality of nodes connected to each other via a network.

In order for a memory user to access a remote memory in the cluster system, a swapper of a computer operating system may be modified and thus the access to the remote memory can be made.

Such a method of accessing the remote memory uses the remote memory not as a memory but as a disk device. In this method, the remote memory is not mapped to a user address space of a process and may not be used through an interface for memory allocation, deallocation, and copy as in an existing memory.

SUMMARY

The present invention has been made in an effort to provide an apparatus for processing a remote page fault, and a method thereof, capable of configuring a large-scale virtual integration memory by integrating respective memories of nodes included in a cluster system, and enabling all the nodes to use the configured virtual integration memory.

Further, the present invention has been made in an effort to provide an apparatus for processing a remote page fault and a method thereof, capable of configuring a large-scale virtual integration memory by integrating respective memories of nodes included in a cluster system, mapping the configured virtual integration memory to a user address space of a process like an existing main memory, and rendering the virtual integration memory usable through an interface for allocation, deallocation, copy, and the like.

In addition, the present invention has been made in an effort to provide an apparatus for processing a remote page fault and a method thereof, capable of configuring a large-scale virtual integration memory by integrating respective memories of nodes included in a cluster system, and processing a page fault when a page fault associated with a remote memory is generated in an operating system.

An exemplary embodiment of the present invention provides an apparatus for processing a remote page fault included in an optional local node within a cluster system configuring a large integration memory (CVM) by integrating individual memories of a plurality of nodes, the apparatus including: a memory including a CVM-map, a node memory information table, a virtual memory area, and a CVM page table; and a main controller allocating a memory having a requested size to the large integration memory when a user process requests memory allocation, and mapping the allocated memory to an address space of a process.

The CVM-map may indicate whether or not pages included in the large integration memory are in use.

The node memory information table may be a table including memory information provided for each of the plurality of nodes to configure the large integration memory.

The node memory information table may include a node number, a start page number of a physical memory provided from a node, an end page number of a physical memory provided from a node, a start page number within the large integration memory, and an end page number within the large integration memory.

The virtual memory area may be a contiguous range of virtual addresses space.

The virtual memory area may include a start virtual address, an end virtual address, and a pointer of a CVM fault handler.

The CVM page table may be a table including mapping information of a virtual address and location information of a remote page mapped to the address space of the process.

The CVM page table may include a virtual address, a node number, and a remote page number.

When the user process requests memory allocation, the main controller may generate a virtual memory area, search for an available area in the address space of the process, and record the searched area in the generated virtual memory area.

The main controller may record a pointer of a CVM fault handler in the virtual memory area, and search the CVM-map for one or more empty pages.

The main controller may check information of a remote node and a physical memory corresponding to the one or more pages that are searched for, from the node memory information table, and records the checked information regarding the physical memory and the remote node corresponding to the one or more pages, and a virtual address in the CVM page table.

The main controller may set bits for the allocated pages in the CVM-map.

The main controller may send information regarding the allocated pages to all nodes included in the cluster system.

Another exemplary embodiment of the present invention provides a method of processing a remote page fault included in an optional local node within a cluster system configuring a large integration memory (CVM) by integrating individual memories of a plurality of nodes, the method including: allocating the large integration memory when a user process requests memory allocation, and mapping the allocated memory to an address space of a process.

The allocating of the large integration memory and mapping the allocated memory to the address space of the process may include: generating a virtual memory area when the user process requests memory allocation; searching for an available area in the address space of the process and recording a start address and an end address of the available area in the generated virtual memory area; recording a pointer of a CVM fault handler in the virtual memory area; searching a CVM-map for one or more empty pages; checking information regarding a remote node and a physical memory corresponding to the one or more pages that are searched for from a node memory information table; recording the checked information regarding the remote node and the physical memory corresponding to the one or more pages, and a virtual address in a CVM page table; setting bits for the one or more allocated pages in the CVM-map; and sending information regarding the allocated pages to all nodes included in the cluster system.

Yet another exemplary embodiment of the present invention provides an apparatus for processing a remote page fault included in an optional local node within a cluster system configuring a large integration memory (CVM) by integrating individual memories of a plurality of nodes, the apparatus including: a page; and a CVM fault handler processing a page fault when initial access to the allocated page occurs.

When initial access to the allocated page occurs, the CVM fault handler may search a CVM page table for a remote page number and a remote node number mapped to a virtual address where a page fault is generated.

The CVM fault handler may request transmission of a corresponding page from a corresponding remote node on the basis of the searched remote node number and remote page number, load a page received in response to the request to a physical memory of a local node, and record, in a page table of a process, mapping information of a virtual address where the page fault is generated and a physical address of the memory to which the received page is loaded.

Still another exemplary embodiment of the present invention provides a method of processing a remote page fault included in an optional local node within a cluster system configuring a large integration memory (CVM) by integrating individual memories of a plurality of nodes, the method including: when initial access to an allocated page is generated, searching a CVM page table for a remote page number and a remote node number mapped to a virtual address where the page fault occurs; requesting transmission of a corresponding page from a corresponding remote node on the basis of the searched remote node number and remote page number; loading the page received in response to the request to a physical memory of the local node; and recording, in a page table of a process, mapping information of the virtual address where the page fault occurs and a physical address of the memory to which the received page is loaded.

The method may further include performing access to a memory on the basis of the memory address mapping information recorded in the page table of the process when access to the same page as the received page recorded in the page table of the process occurs.

According to exemplary embodiments of the present invention, it is possible to configure a large-scale virtual integration memory by integrating respective memories of nodes included in a cluster system, so that each of the nodes included in the cluster system can utilize massive memory resources obtained by integrating memories of remote nodes beyond the limitation of locally installed memories.

According to exemplary embodiments of the present invention, it is also possible to configure a large-scale virtual integration memory by integrating respective memories of nodes included in a cluster system, so that drastically increasing stream data can be efficiently processed by using the integrated virtual integration memory at a higher rate than a disk to process massive memory data.

According to exemplary embodiments of the present invention, it is also possible to map a large-scale virtual integration memory configured by integrating respective memories of nodes included in a cluster system to an address space of an optional process included in each node, so that when a specific node uses a corresponding memory, the memory can be used in the same manner as in an existing main memory, and a program developer can develop an application program using a large integration memory by using an existing programming scheme as it is.

According to exemplary embodiments of the present invention, it is also possible to implement an apparatus for processing a remote page fault as a single loadable module without modifying the operating system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a view illustrating a CVM-map (a CVM memory map).

FIG. 4 is a view illustrating a node memory information table.

FIG. 5 is a view illustrating a structure of a virtual memory area (virtual memory data).

Figure 1:
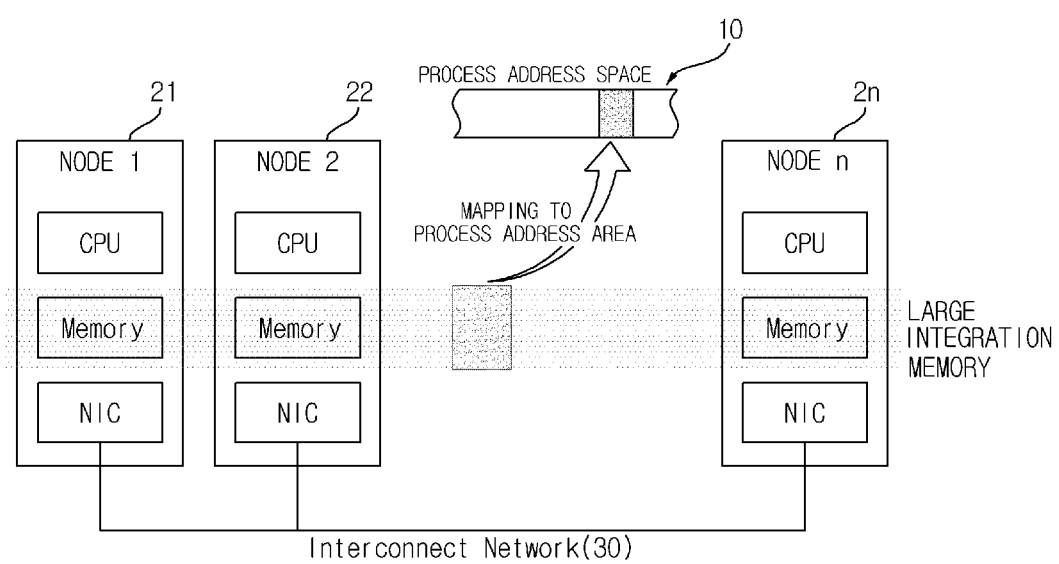
FIG. 1 is a schematic view of a cluster system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Exemplary embodiments of the present invention may be implemented by various means. For example, the exemplary embodiments of the present invention may be implemented firmware, software, or a combination thereof, or the like.

In the implementation by the hardware, a method according to exemplary embodiments of the present invention may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the implementation using the firmware or the software, a method according to exemplary embodiments of the present invention may be implemented by modules, procedures, functions, or the like, that perform functions or operations described above. Software codes are stored in a memory unit and may be driven by a processor. The memory unit is disposed in or out the processor and may transmit and receive data to and from the well-known various units.

A case in which any one part is connected with the other part includes a case in which the parts are directly connected with each other and a case in which the parts are connected with each other with other elements interposed therebetween. Unless explicitly described to the contrary, the word "comprise" and variations such as "comprises" or "comprising" will be understood to imply the inclusion of stated elements but not the exclusion of any other elements.

A term "module" described in the specification means a unit of processing at least one function or operation and can be implemented by hardware or software or a combination of hardware and software.

The specific terms used in the following description are provided in order to help understand the present invention. The use of the specific terms may be changed into other forms without departing from the technical idea of the present invention.

The present invention relates to an apparatus for processing a remote page fault and a method thereof, capable of configuring a large-scale virtual integration memory by integrating respective memories of nodes included in a cluster system, and enabling all the nodes to use the configured virtual integration memory. According to the present invention, a large virtual integration memory is formed by integrating respective memories of nodes included in a cluster system, the configured virtual integration memory is mapped to a user address space of a process like an existing main memory, the virtual integration memory is rendered usable through an interface such as allocation, deallocation, copy, and the like, and a page fault is processed when a page fault associated with a remote memory occurs in an operating system.

Hereinafter, exemplary embodiments of the present invention will be described in detail with reference to the accompanying drawings.

FIG. 1 is a schematic diagram of a cluster system 10 (or a large integration memory system) according to an exemplary embodiment of the present invention.

The cluster system 10 according to the exemplary embodiment of the present invention includes a plurality of nodes 21 to 2n.

The cluster system 10 provides a large-scale integration memory (or a large integration memory) (hereinafter, referred to as a 'CVM') by integrating respective physical memories (or memories) of the nodes. Here, like a main memory provided in each node, the CVM is mapped to an address space of a process, and access to the CVM may be made through an interface such as allocation, deallocation, copy, and the like.

Each of the plurality of nodes 21 to 2n according to the exemplary embodiment of the present invention includes at least one central processing unit (CPU), a memory, and a network interface card (NIC). The plurality of nodes 21 to 2n efficiently processes rapidly increasing massive memory data by using the CVM. Each node includes an apparatus 100 for processing a remote page fault, which will be described below.

The plurality of nodes 21 to 2n are connected to each other via a high-performance network 30.

Figure 2:
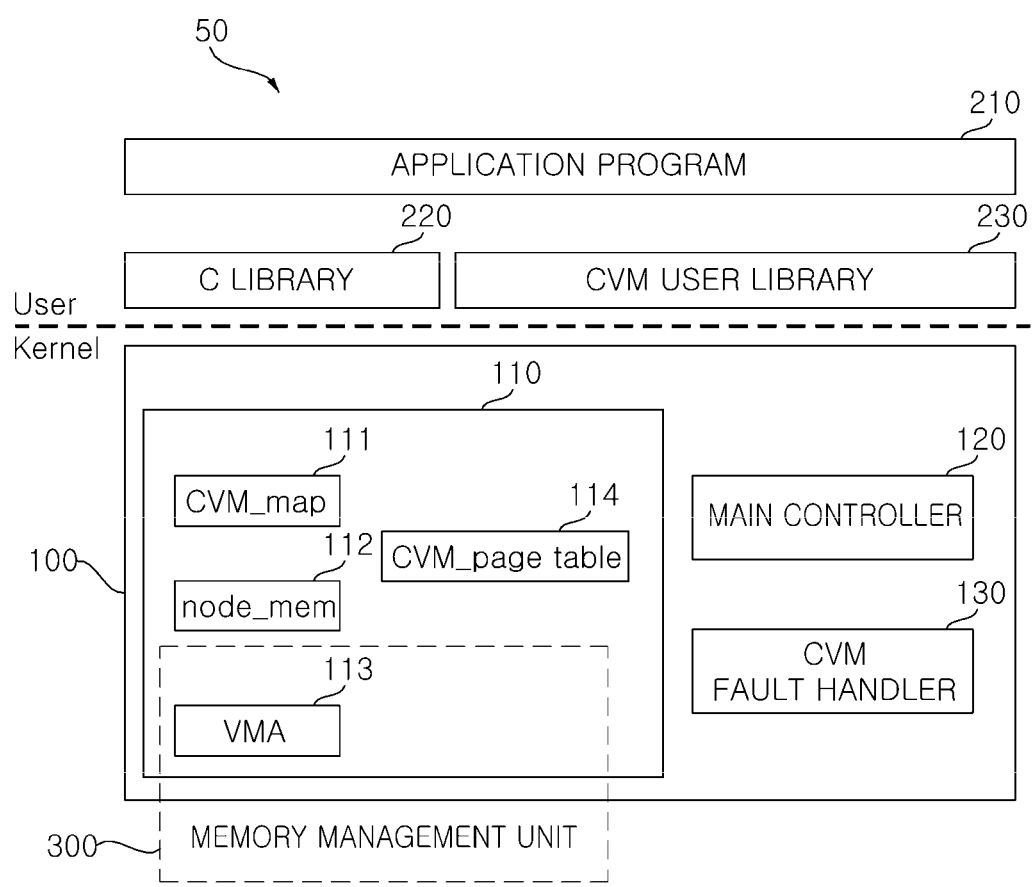
FIG. 2 is a view illustrating a structure of a software layer of a system supporting CVM utilizing an apparatus for processing a remote page fault according to an exemplary embodiment of the present invention.

FIG. 2 is a view illustrating a structure of a software layer of a system supporting a CVM utilizing the apparatus 100 for processing a remote page fault (or a cluster system) according to an exemplary embodiment of the present invention.

A software layer structure 50 of a system supporting the CVM utilizing the apparatus 100 for processing a remote page fault according to the exemplary embodiment of the present invention includes, in terms of a user side, an application program 210, a C library 220 and a CVM user library 230, and in terms of a kernel side, includes the apparatus 100 for processing a remote page fault, and a memory management unit 300.

The application program 210 (or a user process) according to the exemplary embodiment of the present invention allocates a memory to the CVM through an interface provided by the CVM user library 230. The application program 210 performs access functions such as copy, transfer and the like with respect to the allocated memory through the C library 220 or the memory management unit 300 on the kernel level.

When receiving a CVM memory allocation request generated by the application program 210, the apparatus 100 for processing a remote page fault according to the exemplary embodiment of the present invention allocates an area of the CVM as large as requested by the application program 210, and performs mapping upon the allocated area to a process address space.

When initial access to an optional page within the allocated area is attempted and a page fault occurs, the apparatus 100 for processing a remote page fault requests a page from a corresponding node where a page having a page fault actually exists among a plurality of nodes included in the cluster system, loads the page sent by the corresponding node in response to the request to a physical memory (or a memory), and records mapping information of a virtual address and an address of the physical memory in a page table, thus preventing a page fault of a process from occurring in the same page afterwards.

The apparatus 100 for processing a remote page fault includes a memory 110, a main controller 120, and a CVM fault handler 130.

The memory 110 according to the exemplary embodiment of the present invention includes a CVM-map (CVM map) 111, a node memory information table (node mem) 112, a virtual memory area (VMA) 113, and a CVM page table (CVM_page_table) 114.

The CVM according to the exemplary embodiment of the present invention is displayed as one continuous memory space by integrating respective memories of nodes. The CVM is used and managed in the units of pages.

As shown in FIG. 3, the CVM-map 111 according to the exemplary embodiment of the present invention is a bitmap indicating whether or not pages included in the CVM are in use. Here, an allocated page is indicated by '1', and a page which is not allocated is indicated by '0'.

As shown in FIG. 4, the node memory information table 112 according to the exemplary embodiment of the present invention is a table showing information regarding a memory provided in order to configure the CVM for each node. A memory provided by an optional node to configure the CVM occupies the continuous space in the CVM.

The node memory information table 112 includes a node number (Node ID), a start page number of a physical memory provided by a node, an end page number of a physical memory provided by a node, a start CVM page number within the CVM, and an end CVM page number within the CVM.

As shown in FIG. 5, the virtual memory area (VMA) (or a virtual memory table) 113 according to the exemplary embodiment of the present invention is a table (area) that manages an independent continuous memory area of a process address space. The virtual memory area 113 includes a start virtual address, an end virtual address, and a fault handler pointer of the CVM fault handler 130 for a CVM memory.

Figure 6:
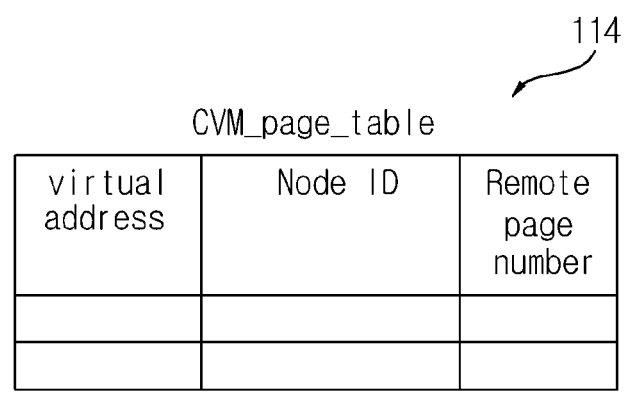
FIG. 6 is a view illustrating a CVM page table.

The CVM page table (CVM_page_table) 114 according to the exemplary embodiment of the present invention is a table that includes location information of a remote page mapped to an address space of a process and mapping information of a virtual address. The CVM page table 114, as shown in FIG. 6, includes a virtual address, a node number (Node ID), and a remote page number.

When receiving a request for CVM memory allocation from the application program 210 (or a user process), the main controller 120 according to the exemplary embodiment of the present invention generates the virtual memory area 113, searches for an available area in a virtual address space of a process (or an address space of a process), and records a start address and an end address in the virtual memory area 113. The main controller 120 registers a pointer of the CVM fault handler 130 in the virtual memory area 113. The main controller 120 searches for one or more empty pages as many as an optional space to be allocated in the CVM-map 111, and checks information regarding a remote node and a physical memory corresponding to the searched page, from the node memory information table 112. The main controller 120 records location information of the checked page (including the information regarding a remote node and a physical memory corresponding to the searched page), and a virtual address thereof on the CVM page table 114. The main controller 120 sets a bit for an allocated page to the CVM-map 111. The main controller 120 sends information regarding a page allocated to another node belonging to the cluster system so that each CVM-map present in another node can be modified.

When a page fault occurs, the CVM fault handler 130 according to the exemplary embodiment of the present invention processes the page fault. That is, when a page fault occurs due to initial access to an allocated page, a page fault handler of an existing operating system is executed, and the CVM fault handler 130 connected to the fault handler pointer of the virtual memory area 113 is executed. The CVM fault handler 130 searches the CVM page table 114 for a remote node number and a remote page number mapped to a virtual address where the page fault occurs, and requests the transmission of the corresponding page from the corresponding remote node (or a remote node corresponding to the searched remote node number) on the basis of the searched remote node number and remote page number. The CVM fault handler 130 receives a page transmitted from the corresponding remote node in response to the request, loads the received page to a physical memory of a local node having the CVM fault handler 130, and records mapping information between an address of the physical memory and a virtual address in a page table of a process. Thereafter, if access to the same page occurs, access to memory is performed by using the previously recorded address mapping information on the page table of the process under control of the memory management unit 300.

The memory management unit 300 according to the exemplary embodiment of the present invention performs access function such as copy, transfer and the like with respect to an allocated memory.

Figure 7:
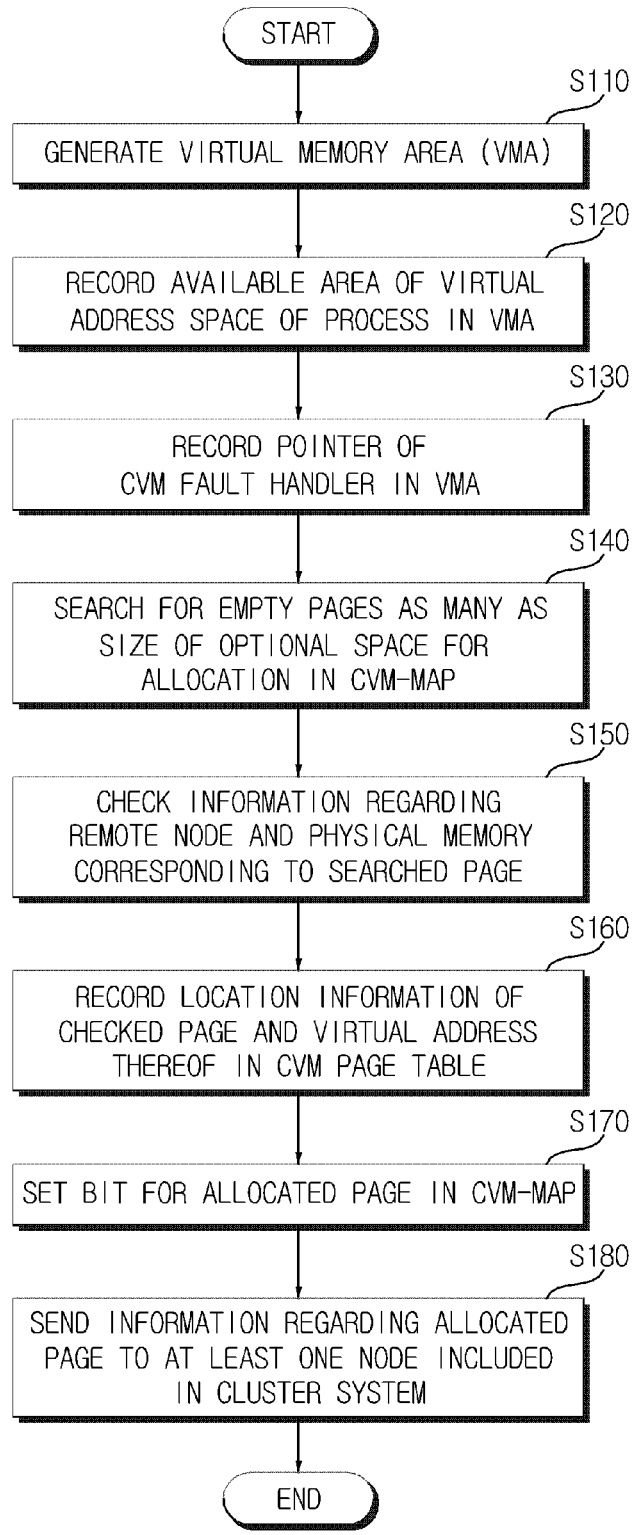
FIG. 7 is a flowchart for explaining CVM memory allocation using an apparatus for processing a remote page fault according to an exemplary embodiment of the present invention.

FIG. 7 is a flowchart for explaining the allocation of a CVM memory using an apparatus for processing a remote page fault according to an exemplary embodiment of the present invention.

Hereinafter, the present invention will be described using FIGS. 1 through 7.

First, in an optional local node within a cluster system including a plurality of nodes each including the apparatus 100 for processing a remote page fault, when a user process requests memory allocation, the main controller 120 generates a virtual memory area (VMA) 113 in operation s110. Here, the virtual memory area 113 is a table that manages an independent area of a process address space, and includes a start virtual address of a continuous memory area, an end virtual address, and a pointer of the CVM fault handler 130 for a CVM memory.

In operation 5120, the main controller 120 searches for an available area in a virtual address space of a process, and records a start address and an end address of the searched available area in the generated virtual memory area 113.

In operation 5130, the main controller 120 records the pointer of the CVM fault handler 130 in a pointer of a CVM fault handler within the virtual memory area 113.

The main controller 120 searches for one or more empty pages in the CVM-map 111. Here, the CVM-map 111 is a bitmap indicating whether or not pages included in the CVM are in use.

That is, in operation 5140, the main controller 120 searches for empty pages as many as the size of an optional space for allocation in the CVM-map 111.

In operation 5150, the main controller 120 checks information regarding a remote node and a physical memory corresponding to the searched page from the node memory information table 112. Here, the node memory information table 112 is a table containing information regarding a memory provided to configure a CVM for each node.

The main controller 120 records location information of the checked page and a virtual address thereof in the CVM page table 114. Here, the CVM page table 114 includes a virtual address, a node number, and a remote page number, together with mapping information of the virtual address and location information of a remote page mapped to a process address space.

That is, in operation 5160, the main controller 120 records the virtual address, and the information regarding the remote node and the physical memory corresponding to the checked page in the CVM page table 114.

In operation 5170, the main controller 120 sets a bit for the allocated page in the CVM-map 111.

The main controller 120 sends information regarding the allocated page to at least one node belonging to the cluster system 10.

In this case, in operation 5180, the at least one node receiving the information regarding the allocated page, sent from the main controller 120, modifies (or updates) the CVM-map present in each node on the basis of the received information regarding the allocated page.

Figure 8:
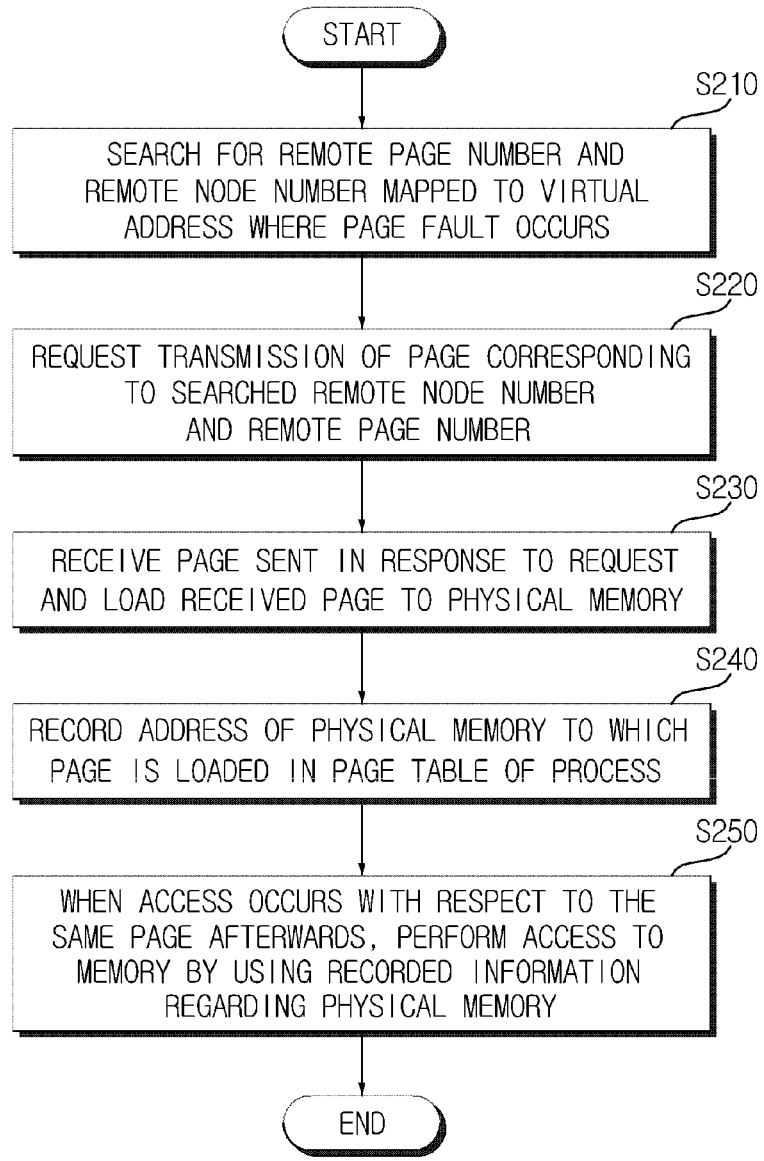
FIG. 8 is a flowchart for explaining a method of processing a remote page fault according to an exemplary embodiment of the present invention.

FIG. 8 is a flowchart for explaining a method of processing a remote page fault according to an exemplary embodiment of the present invention.

Hereinafter, the present invention will be described using FIGS. 1 through 8.

First, in an apparatus for processing a remote page fault included in an optional local node within a cluster system configuring a CVM by integrating individual physical memories of a plurality of nodes, when initial access to an allocated page occurs, the CVM fault handler 130 searches the CVM page table 114 for a remote page number and a remote node number mapped to a virtual address where the page fault occurs in operation 5210.

In operation 5220, the CVM fault handler 130 requests transmission of the corresponding page from the corresponding remote node (or a remote node corresponding to the searched remote node number) on the basis of the searched remote node number and remote page number.

In operation 5230, the CVM fault handler 130 receives a page transmitted from the corresponding remote node in response to the request for page transmission, and loads the received page to a physical memory.

In operation 5240, the CVM fault handler 130 records mapping information between the address of the physical memory loaded with the received page and the corresponding virtual address in a page table of a process.

In operation 5250, when access to the same page occurs afterwards, the memory management unit 300 performs access to a memory by using the address mapping information already recorded in the page table of a process.

The apparatus for processing a remote page fault and a method thereof according to embodiments of the present invention is applicable to any field in which a page fault occurs by using a large integration memory.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for processing a remote page fault included in a local node within a cluster system configuring a large integration memory (CVM) by integrating individual memories of a plurality of nodes, the apparatus comprising:
 a CVM fault handler;
 a memory including a CVM-map, a node memory information table, a virtual memory area including a start virtual address, an end virtual address, and a pointer of the CVM fault handler, and a CVM page table; and
 a main controller mapping the large integration memory to an address space of a process when a user process requests memory allocation,
 wherein when a remote page fault occurs, the CVM fault handler processes the remote page fault.

2. The apparatus of claim 1, wherein the CVM-map indicates whether or not pages included in the large integration memory are in use.

3. The apparatus of claim 1, wherein the node memory information table is a table including memory information provided for each of the plurality of nodes to configure the large integration memory.

4. The apparatus of claim 3, wherein the node memory information table includes a node number, a start page number of a physical memory provided from a node, an end page number of a physical memory provided from a node, a start page number within the large integration memory, and an end page number within the large integration memory.

5. The apparatus of claim 1, wherein the virtual memory area is a contiguous range of virtual addresses space.

6. The apparatus of claim 1, wherein the CVM page table is a table including mapping information of a virtual address and location information of a remote page mapped to the address space of the process.

7. The apparatus of claim 6, wherein the CVM page table includes a virtual address, a node number, and a remote page number.

8. The apparatus of claim 1, wherein when the user process requests memory allocation, the main controller generates a virtual memory area, searches for an available area in the address space of the process, and records the searched area in the generated virtual memory area.

9. The apparatus of claim 8, wherein the main controller records the pointer of the CVM fault handler in the virtual memory area, and searches the CVM-map for one or more empty pages.

10. The apparatus of claim 9, wherein the main controller checks information regarding a remote node and a physical memory corresponding to the one or more pages that are searched for, from the node memory information table, and records the checked information regarding the physical memory and the remote node corresponding to the one or more pages, and a virtual address in the CVM page table.

11. The apparatus of claim 10, wherein the main controller sets bits for the allocated pages in the CVM-map.

12. The apparatus of claim 10, wherein the main controller sends information regarding the allocated pages to all nodes included in the cluster system.

13. A method of processing a remote page fault included in a local node within a cluster system configuring a large integration memory (CVM) by integrating individual memories of a plurality of nodes, the method comprising:
 allocating a memory as large as requested in the large integration memory when a user process requests memory allocation;
 mapping the allocated memory to an address space of a process; and
 processing the remote page fault using a CVM fault handler associated with the address space, wherein the allocating of the large integration memory and mapping the allocated memory to the address space of the process comprises:
 generating a virtual memory area when the user process requests memory allocation;
 searching for an available area in the address space of the process and recording a start address and an end address of the available area in the generated virtual memory area;
 recording a pointer of the CVM fault handler in the virtual memory area;
 searching a CVM-map for one or more empty pages;
 checking information regarding a remote node and a physical memory corresponding to the one or more pages that are searched for, from a node memory information table;

recording the checked information regarding the remote node and the physical memory corresponding to the one or more pages, and a virtual address in a CVM page table; setting bits for the allocated pages in the CVM-map; and sending information regarding the allocated pages to all nodes included in the cluster system.

14. An apparatus for processing a remote page fault included in a local node within a cluster system configuring a large integration memory (CVM) by integrating individual memories of a plurality of nodes, the apparatus comprising:
a CVM fault handler;
a virtual memory area associated with a portion of an address space and including a pointer of the CVM fault handler; and
an allocated page within the portion of the address space, wherein when an initial access to the allocated page occurs, the CVM fault handler processes a remote page fault.

15. The apparatus of claim 14, wherein, when initial access to the allocated page occurs, the CVM fault handler searches a CVM page table for a remote page number and a remote node number mapped to a virtual address where the remote page fault is generated.

16. The apparatus of claim 15, wherein the CVM fault handler requests transmission of a corresponding page from a corresponding remote node on the basis of the searched remote node number and remote page number, loads a page received in response to the request to a physical memory of a local node, and records, in a page table of a process, mapping information of a virtual address where the remote page fault is generated and a physical address of the memory to which the received page is loaded.

17. A method of processing a remote page fault included in a local node within a cluster system configuring a large integration memory (CVM) by integrating individual memories of a plurality of nodes, the method comprising:
when an initial access to an allocated page is generated, determining a virtual memory area according to a virtual address where the remote page fault occurs, the virtual memory area including a pointer to a CVM fault handler, and executing the CVM fault handler, wherein executing the CVM fault handler comprises:
searching a CVM page table for a remote page number and a remote node number mapped to the virtual address where the remote page fault occurs;
requesting transmission of a corresponding page from a corresponding remote node on the basis of the searched remote node number and remote page number;
loading the page received in response to the request to a physical memory of the local node; and
recording, in a page table of a process, mapping information of the virtual address where the remote page fault occurs and a physical address of the memory to which the received page is loaded.

18. The method of claim 17, further comprising: when access to the same page as the received page recorded in the page table of the process occurs, performing access to a memory on the basis of the memory address mapping information recorded in the page table of the process.

* * * * *